(12) United States Patent
Leary

(10) Patent No.: US 6,422,705 B1
(45) Date of Patent: Jul. 23, 2002

(54) KALEIDOSCOPE

(76) Inventor: Andrew Peter Leary, Waipapa Road R.D.2, Keri Keri (NZ)

(*) Notice: Subject to any disclaimer, the term of this patent is extended or adjusted under 35 U.S.C. 154(b) by 0 days.

(21) Appl. No.: 09/586,761

(22) Filed: Jun. 5, 2000

(51) Int. Cl.[7] .................. G02B 27/08; G03B 21/00; F21V 14/00; F21V 11/00; B60Q 1/00
(52) U.S. Cl. .................. 359/616; 353/1; 362/255; 362/257; 362/282; 362/284; 362/368; 446/16; 446/20
(58) Field of Search ................. 359/616, 617; 353/1; 362/255, 257, 282, 283, 284, 368; 446/15, 16, 20

(56) References Cited

U.S. PATENT DOCUMENTS

| 3,358,556 A | * | 12/1967 | Brown ..................... 353/2 |
| 3,661,439 A | * | 5/1972 | Burnside, III et al. ......... 353/1 |
| 4,170,400 A | * | 10/1979 | Bach et al. ................ 385/119 |
| 4,172,629 A | * | 10/1979 | Allen ...................... 359/616 |
| 4,652,084 A | * | 3/1987 | Daszinnies ................ 359/443 |
| 4,733,960 A | * | 3/1988 | Bennett ....................... 353/1 |
| 5,094,525 A | * | 3/1992 | Nelson, Jr. et al. ........... 353/1 |
| 5,223,889 A | * | 6/1993 | Mouner ..................... 355/43 |
| 5,225,934 A | * | 7/1993 | Kroll ...................... 359/616 |
| 5,469,297 A | * | 11/1995 | Marshall et al. ........... 359/617 |

\* cited by examiner

Primary Examiner—Christopher Mahoney
Assistant Examiner—Magda Cruz
(74) Attorney, Agent, or Firm—Young & Thompson

(57) ABSTRACT

A kaleidoscope or teleidoscope is provided in which the viewed object is an image focused onto a back-projection screen positioned at the objective end of the mirror system. Focusing may be by a pair of achromatic lenses which may be displaceable toward and away from the screen and the screen preferably comprises a wax layer sandwiched between glass plates one of which is in contact with the objective ends of the mirrors. In one embodiment an illuminated soap bubble in a glass globe is viewed through a kaleidoscope the length of which is reduced by redirecting the image by means of mirrors.

10 Claims, 2 Drawing Sheets

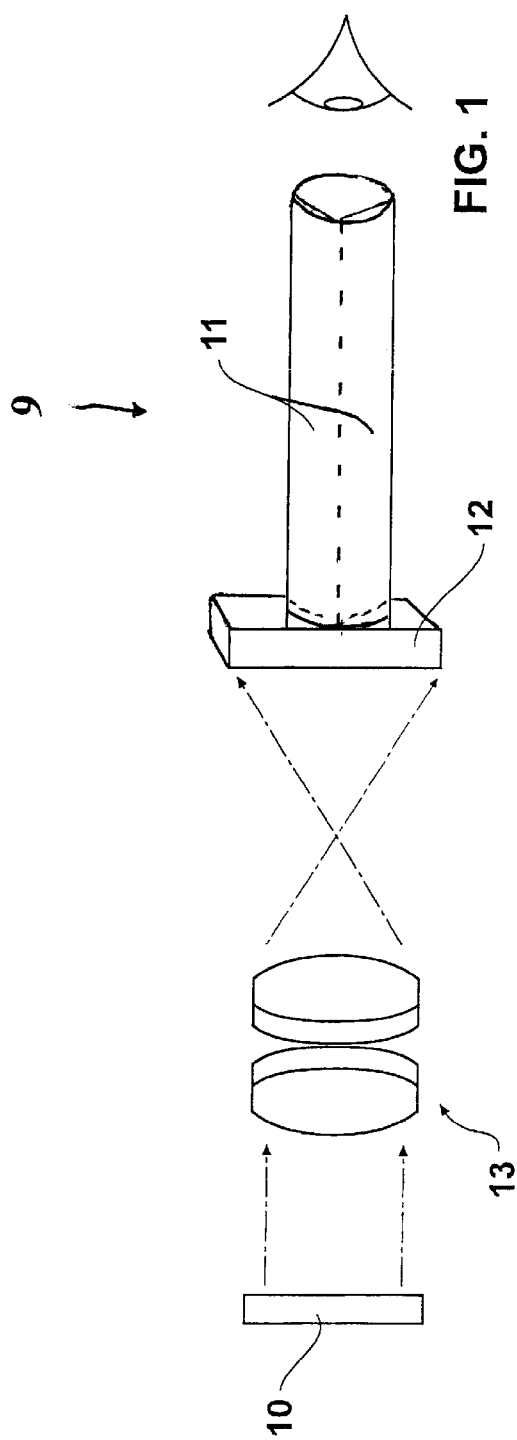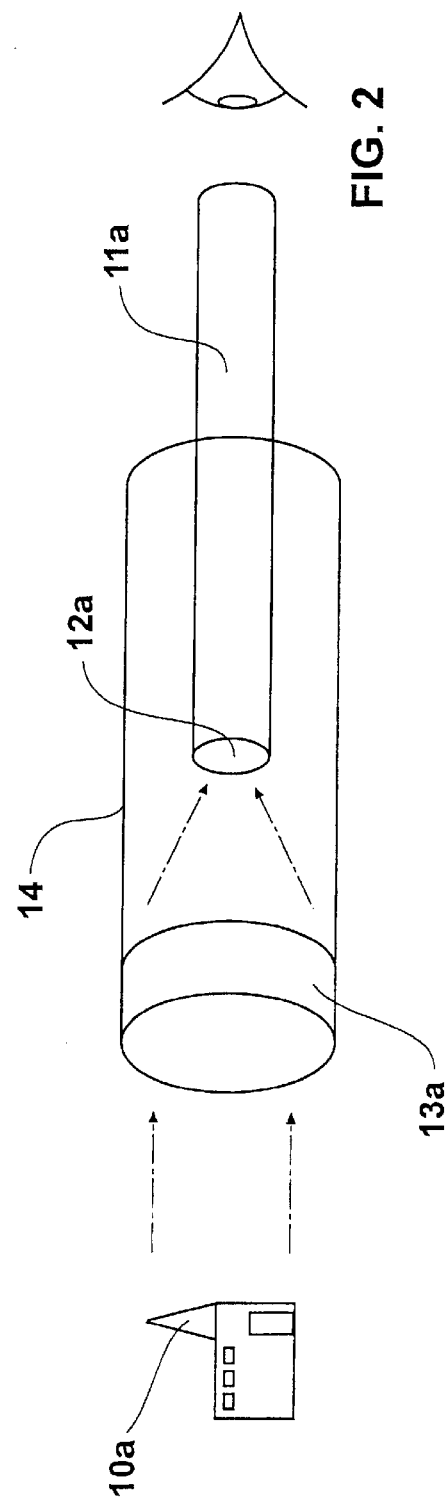

KALEIDOSCOPE

FIELD OF THE INVENTION

This invention relates to an improved kaleidoscope device.

BACKGROUND OF THE INVENTION

Kaleidoscopes have been popular for many years. Their invention is credited to Sir David Brewster in the Victorian era and generations of children have marvelled at the beautiful images a kaleidoscope can provide.

Traditionally a kaleidoscope consists of a tube containing two or more angularly related rectangular plane mirrors which have contiguous long edges near the axis of the tube. The user looks through an eyepiece at one end of the tube at an objective at its other end and the multiple images of the objective reflected by the mirrors provide a symmetrical image. Typically the objective is loose pieces of brightly coloured stuff, and as the tube is moved these rearrange themselves providing an ever-changing image.

A variation of the kaleidoscope is a so-called teleidoscope in which the viewed objective is not part of the apparatus but one's surroundings. The surroundings are viewed through a fish-eye lens at the bottom of the mirror tube. This system is imperfect in that a fish-eye lens necessarily distorts the image and moreover the image should be as close as possible to the ends of the mirrors remote from the eye piece to provide the desired symmetry.

OBJECTS OF THE INVENTION

The principal object of the invention is to improve upon prior art proposals and more specifically to improve upon the quality of kaleidoscopic images. The subject of this image may be the kaleidoscope user's surroundings, or in a favoured embodiment of the invention it may be the surface of a bubble.

SUMMARY OF THE INVENTION

These and other objects of the invention are achieved in that the objective end of the kaleidoscope is touching a rear projection screen onto which any chosen image may be back-projected.

Preferably a lens or lens system is employed to focus an image onto the screen and the object or objects providing the image is preferably illuminated by a source of light.

BRIEF DESCRIPTION OF THE DRAWINGS

Preferred embodiments of the invention will now be described by way of non-limitative example with reference to the accompanying drawings, in which:

FIG. 1 illustrates a kaleidoscope in accordance with the invention;

FIG. 2 illustrates a teleidoscope in accordance with the invention, and

DETAILED DESCRIPTION OF PREFERRED EMBODIMENTS

Figure 3:
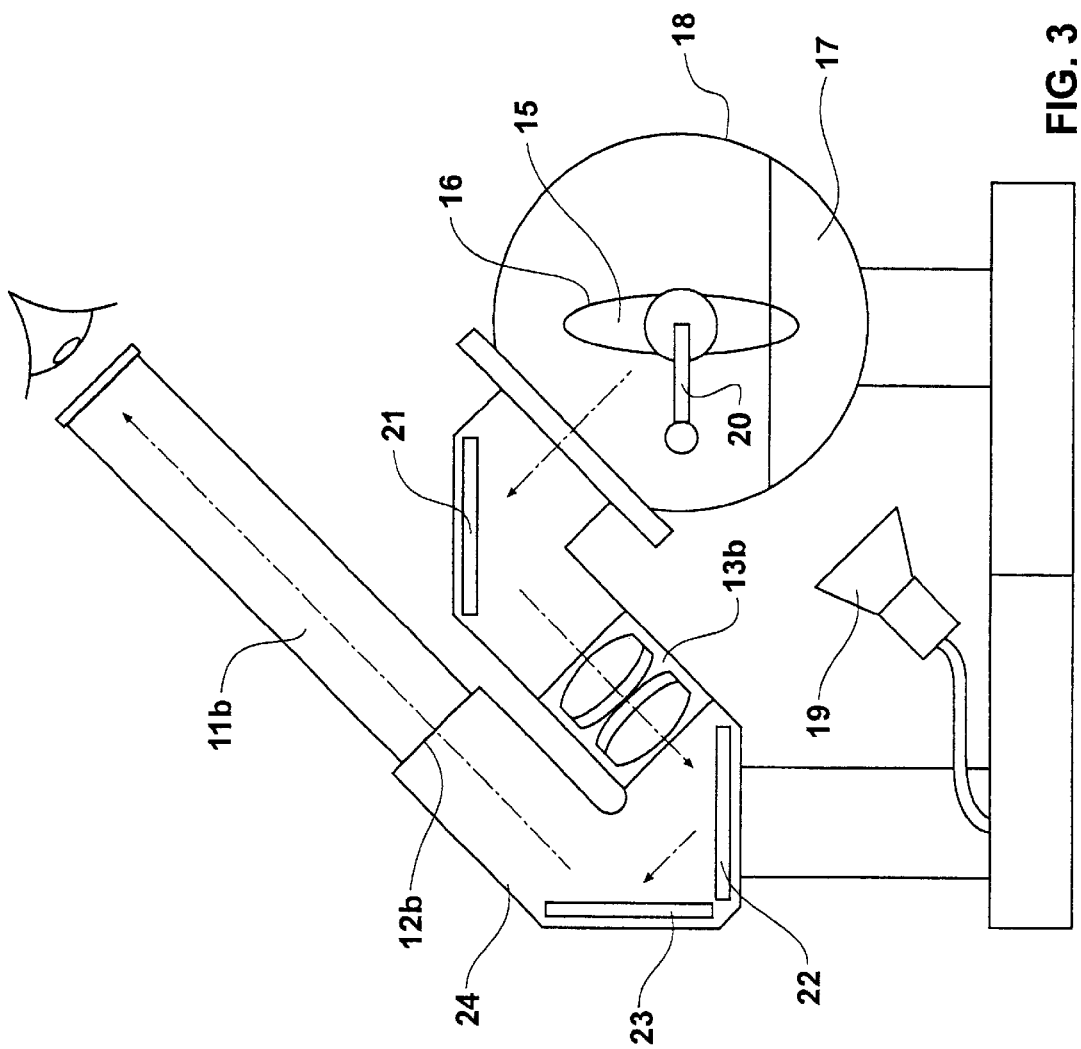
FIG. 3 is a sectional elevation of apparatus embodying the kaleidoscope of FIG. 1.

In FIG. 1 the image of an object 10 is being viewed through a kaleidoscope 9. As is known per se and so will not be described in more detail the kaleidoscope 9 comprises two or more elongated mirrors 11 angularly related and meeting along long edges so that something viewed at the objective end of the kaleidoscope is symmetrically replicated as a pattern.

In contrast to a conventional kaleidoscope, however, there is positioned at the objective ends of the mirrors 11 a back-projection screen 12 which consists of two layers of glass, sandwiching between them a layer of wax.

Spaced from the screen 12 on the side thereof remote from the mirrors 11 is a lens system 13.

Preferably this has the function of focusing on the screen 12 an image of the object 10 being viewed.

In use the mirrors 11, screen 12 and lens system 13 will preferably be mounted in a common housing, which will preferably be analogous to that of a telescope in that provision will be made for moving the lens system 13 toward and away from the screen 12 for focusing purposes, so that adjustment can be made depending on the distance from the kaleidoscope of the object 10 being viewed.

The teleidoscope of FIG. 2 is generally similar to the kaleidoscope of FIG. 1 and like parts have like references with the addition of the suffix "A". The teleidoscope of FIG. 2 has a hand-held casing 14 relative to which the mirror system 11A is telescopic to enable the lens system 13A at one end of the casing to focus on the screen 12A, at the inner end of the mirror system 11A, an image of an object 10A depending on the distance of that object 10A from the person viewing it by holding the casing 14.

The kaleidoscope of FIG. 3 is used to view a film 15 produced by dipping a ring 16 into soapy water 17 in the bottom of a glass globe 18. The ring 16 is dipped by rotating a handle 20. A light 19 is positioned to shine on the film 15 through the globe 18 to enhance the image which is viewed down the mirror system 11B. The focal length of the lens system 13B is in this instance fixed at around 400 mm and to avoid an awkwardly long apparatus the image is directed by three mirrors 21, 22, 23 through a generally U-shaped housing 24 to the screen 12B.

What is claimed is:

1. A kaleidoscope device comprising a tube having a viewing end and an objective end, angularly related mirrors extending within the tube, a rear projection screen at the objective end of the tube and at least one focusing lens between the screen and a viewable object, the focusing lens focusing an image of the object onto the screen.

2. A device as claimed in claim 1, wherein the mirrors extend into contact with the screen on a side of the screen opposite the at least one focusing lens.

3. A device as claimed in claim 1, further comprising a light source.

4. A device as claimed in claim 3 and comprising means for transmitting light of the light source from an object to the screen so that a focused image of the object will be viewed on the screen.

5. A kaleidoscope device comprising a tube having a viewing end and an objective end, angularly related mirrors extending within the tube, a rear projection screen at the objective end of the tube, a source of light, means for reflecting light of said source from an object to said screen on the side thereof remote from the mirrors, and at least one focusing lens focusing the reflected light to provide an image of the object on the screen.

6. A device as claimed in claim 5 wherein the at least one focusing lens comprises a wax layer between sheets of glass.

7. A device as claimed in claim 6 wherein ends of the mirrors are in close proximity to the one of said glass sheets nearer thereto.

8. A device as claimed in claim 6, wherein the at least one focusing lens comprises double achromatic lenses.

9. A device as claimed in claim 6 and comprising a container to which the objective end of the tube may be secured, the container being adapted to admit light from said light source and a support for said object being positioned in the container so as to reflect light of the light source to the objective end of the tube via the at least one focusing lens.

10. A device as claimed in claim 9 wherein said support is a bubble-forming ring and wherein the container is adapted to contain a soap solution.

\* \* \* \* \*